United States Patent
Hotta et al.

(10) Patent No.: US 8,937,109 B2
(45) Date of Patent: Jan. 20, 2015

(54) METHOD FOR PRODUCING COMPOSITE AND THE COMPOSITE

(75) Inventors: Atsushi Hotta, Kanagawa (JP); Masaaki Mori, Kanagawa (JP)

(73) Assignee: Keio University, Tokyo (JP)

( * ) Notice: Subject to any disclaimer, the term of this patent is extended or adjusted under 35 U.S.C. 154(b) by 152 days.

(21) Appl. No.: 13/391,877

(22) PCT Filed: Aug. 31, 2010

(86) PCT No.: PCT/JP2010/005343
§ 371 (c)(1),
(2), (4) Date: Feb. 23, 2012

(87) PCT Pub. No.: WO2011/024488
PCT Pub. Date: Mar. 3, 2011

(65) Prior Publication Data
US 2012/0164352 A1    Jun. 28, 2012

(30) Foreign Application Priority Data
Aug. 31, 2009   (JP) .................................. 2009-200019

(51) Int. Cl.
| | | |
|---|---|---|
| B29C 71/04 | (2006.01) | |
| C08F 2/46 | (2006.01) | |
| A61L 2/08 | (2006.01) | |
| A61L 24/00 | (2006.01) | |
| C08G 61/04 | (2006.01) | |
| C08J 3/28 | (2006.01) | |
| C08J 3/20 | (2006.01) | |
| C08J 3/21 | (2006.01) | |

(52) U.S. Cl.
CPC .. *C08J 3/28* (2013.01); *C08J 3/201* (2013.01); *C08J 3/212* (2013.01); *C08J 2300/00* (2013.01); *C08J 2323/06* (2013.01); *C08J 2323/12* (2013.01); *C08J 2325/06* (2013.01)
USPC ................. 522/71; 522/1; 522/189; 522/184; 520/1

(58) Field of Classification Search
CPC   B29C 71/04; B29C 2035/0877; B29C 59/16; C08L 23/06; C08L 2312/06
USPC .............................. 522/71, 1, 189, 184; 520/1
See application file for complete search history.

(56) References Cited

U.S. PATENT DOCUMENTS

| | | | |
|---|---|---|---|
| 2005/0186104 A1 * | 8/2005 | Kear et al. ........................ | 419/11 |
| 2006/0025515 A1 * | 2/2006 | Scaringe et al. ............... | 524/496 |
| 2007/0004864 A1 * | 1/2007 | Beatty et al. ................... | 525/240 |

FOREIGN PATENT DOCUMENTS

| | | | |
|---|---|---|---|
| JP | 2000-129280 | | 9/2000 |
| JP | 2005-125503 | * | 5/2005 |
| JP | 2006-249276 | | 9/2006 |
| JP | 2006-307199 | | 9/2006 |

OTHER PUBLICATIONS

Okubo, 2005-125503 Machine translation.*
International Search Report dated Nov. 30, 2010.

* cited by examiner

*Primary Examiner* — Ling Choi
*Assistant Examiner* — Jessica E Whiteley
(74) *Attorney, Agent, or Firm* — Rankin, Hill & Clark LLP

(57) ABSTRACT

The present invention is a method for producing a composite including a matrix and a dispersed material dispersed in the matrix. The method includes introducing a raw material for dispersed material which constitutes a dispersed material into a fluid including a melt of a raw material for matrix which constitutes a matrix or a solution containing a raw material for matrix by a vapor deposition method, to obtain a composite.

18 Claims, 13 Drawing Sheets

FIG. 4
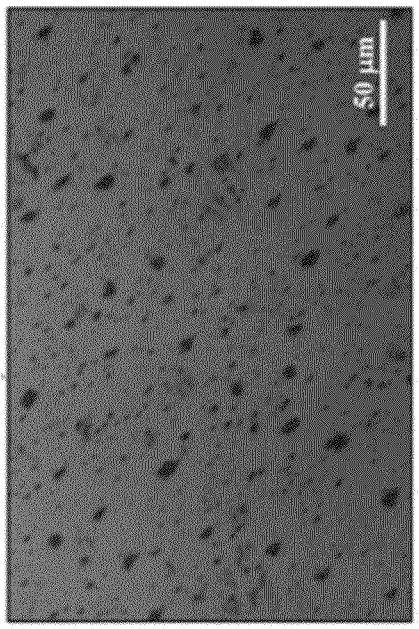
(b)
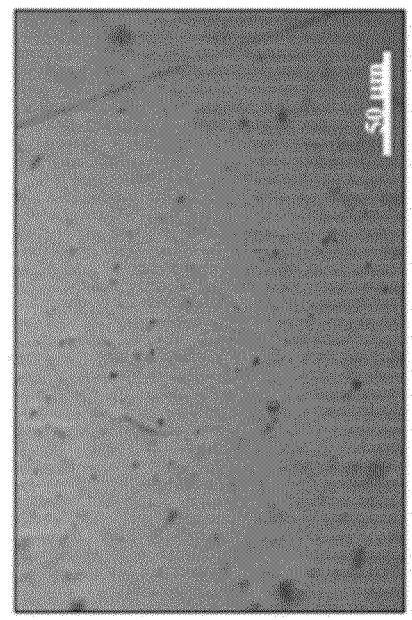
(a)
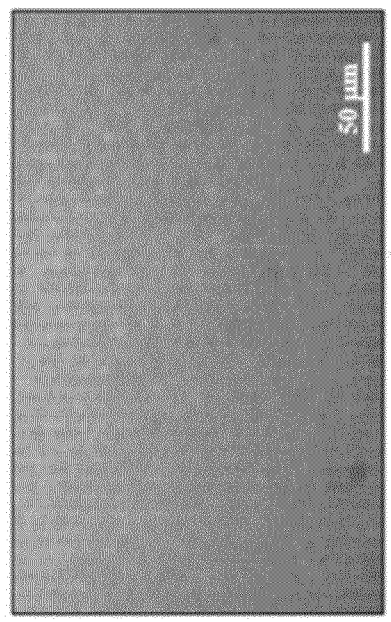
(c)

FIG. 5
(a)
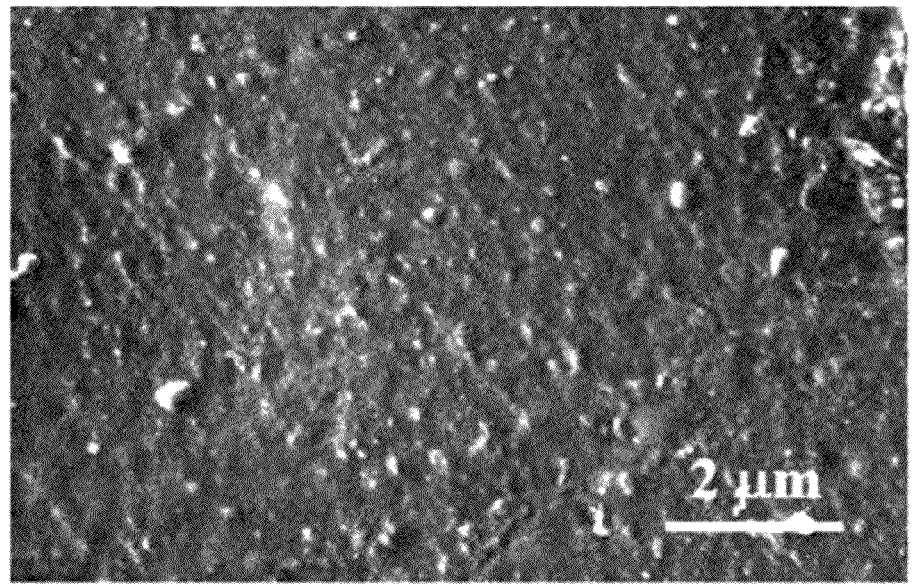
(b)
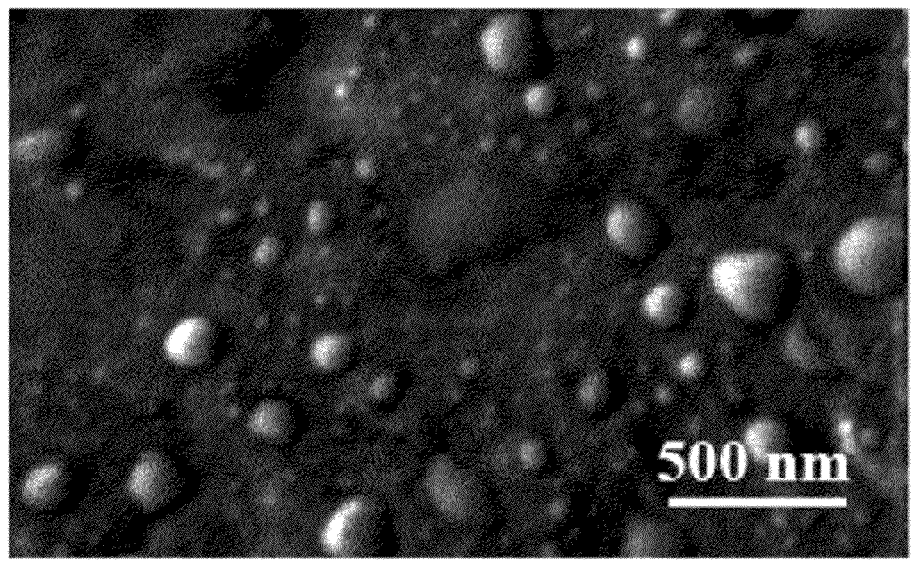

FIG. 6
(a)
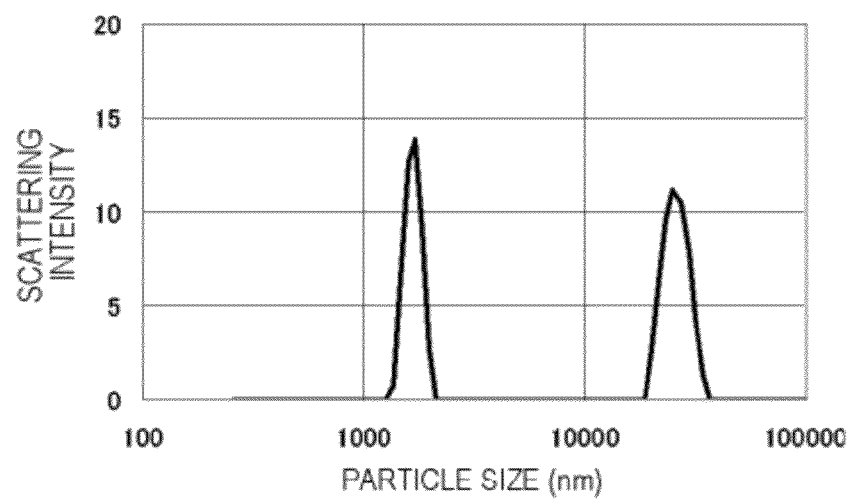
(b)
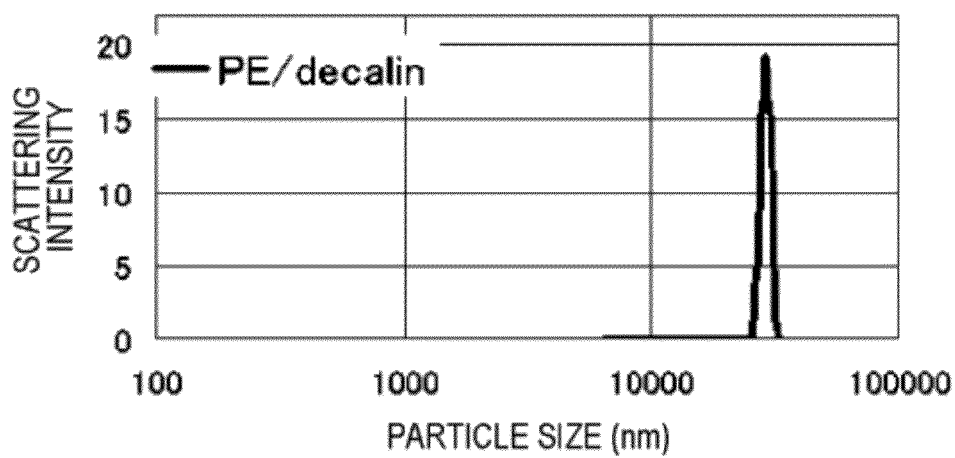

FIG. 7
(a) 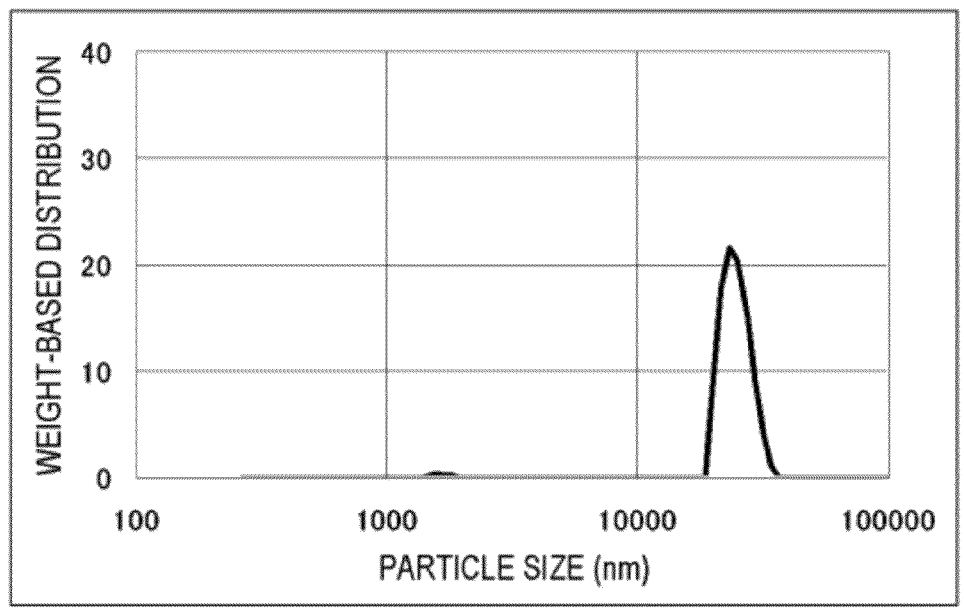
(b) 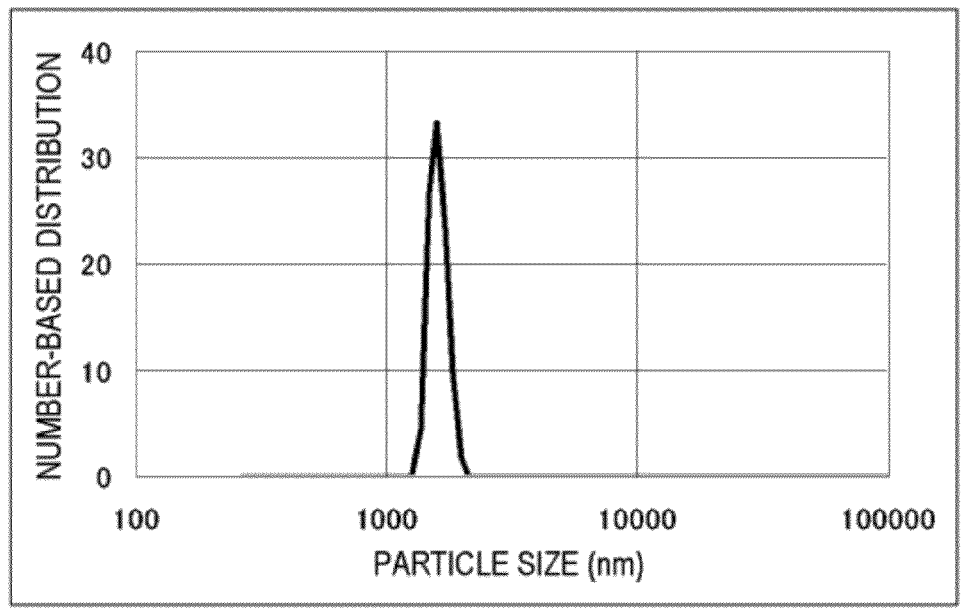

METHOD FOR PRODUCING COMPOSITE AND THE COMPOSITE

TECHNICAL FIELD

The present invention relates to a method for producing a composite and a composite obtained by the method.

BACKGROUND ART

In recent years, polymer materials have been used in various fields such as food packaging, machinery, and medical equipment, and demand for such polymer materials has been growing. A composite is one of the methods of high functionalization of polymer materials. "Composite" is a general term for complex materials produced by combining two or more different raw materials together. A microcomposite having a filler whose size is 1 μm or more, and a nanocomposite having a filler whose one of the three dimensions is about one to several tens of nanometers are exemplified as the composite composed of a polymer matrix and a powder filler and classified according to a filler size of the powder in the composite. In various types of composites, significant improvements of physical properties have been verified. Therefore, high functionalization of materials is expected from further development ahead.

As an example of a functional composite, it is described in Patent Document 1 that a composite having high wear resistance and low frictional properties can be obtained by dispersing a hard amorphous carbon powder (diamond-like carbon: DLC) as a dispersed material in a matrix such as a resin-based material, a metal-based material, or a ceramic material.

In Patent Document 2, it is described that a nanocomposite having nanoparticles which are uniformly dispersed as a dispersed material in a matrix can be obtained by using a graft polymer as the matrix without performing treatment for modifying the surface of the nanoparticles or adding a dispersing agent.

In Patent Document 3, a method for producing a nanocomposite is described saying that a nanocomposite can be easily obtained by mixing a matrix composed of an organic polymer such as an epoxy resin and a nanosized inorganic filler such as alumina as a dispersed material, and then uniformly dispersing the inorganic filler with the use of an apparatus such as a homomixer or a nanomizer.

RELATED DOCUMENTS

Patent Documents

Patent Document 1: Japanese Laid-open patent publication NO. 2000-129280
Patent Document 2: Japanese Laid-open patent publication NO. 2006-307199
Patent Document 3: Japanese Laid-open patent publication NO. 2006-249276

DISCLOSURE OF THE INVENTION

However, such conventional methods for producing a composite have a limited choice of matrixes or dispersed materials, and leave room for improvement in the control of shape, size, or distribution of a dispersed phase to be formed.

In Patent Document 1, a method for dispersing a DLC powder as a dispersed material in a thermoplastic resin as a matrix by mixing them with stirring is described. However, this method has a problem that DLC particles agglomerate together.

The techniques disclosed in Patent Documents 2 and 3 have a problem that a matrix and a dispersed material used for producing a composite are limited to particular materials, and also have a problem that it takes time to perform condition setting or treatment for preventing agglomeration of a dispersed material.

Further, all the techniques disclosed in Patent Documents 1 to 3 use, as a dispersed material, particles previously processed to have a predetermined size and a predetermined shape, and therefore it is difficult for these techniques to form particles whose shape or size is adjusted to be different depending on the desired physical properties of a composite to be produced.

In view of the circumstances, it is an object of the present invention to provide a method for producing a composite including a matrix and a dispersed material dispersed in the matrix, by which a desired composite can be easily obtained.

The present invention provides a method for producing a composite including a matrix and a dispersed material dispersed in the matrix, the method including introducing a raw material for dispersed material which constitutes the dispersed material into a fluid including a melt of a raw material for matrix which constitutes the matrix or a solution containing the raw material for matrix by a vapor deposition method to obtain the composite.

Further, the present invention provides a composite produced by the above method.

Further, the present invention provides an apparatus for producing a composite including a matrix and a dispersed material dispersed in the matrix, the apparatus including: a fluidizing unit fluidizing a fluid including a melt of a raw material for matrix which constitutes the matrix or a solution containing the raw material for matrix; and a vapor deposition unit introducing a raw material for dispersed material which constitutes the dispersed material into the fluid by a vapor deposition method.

According to the present invention, a raw material for dispersed material which constitutes a dispersed material is introduced into a fluid including a melt of a raw material for matrix which constitutes a matrix or a solution containing a raw material for matrix by a vapor deposition method, which makes it possible to introduce the raw material for dispersed material in the form of fine particles such as atoms, molecules, ions, or plasma into the liquid raw material for matrix. Therefore, a composite composed of desired materials can be obtained by setting the state of the fluid and the conditions under vapor deposition of the raw material for dispersed material. Further, the size, shape, and distribution of the dispersed material can be easily controlled by controlling the state of the fluid and the conditions under vapor deposition of the raw material for dispersed material. This makes it possible to easily obtain a desired composite.

According to the present invention, it is possible to easily obtain a desired composite.

BRIEF DESCRIPTION OF THE DRAWINGS

FIG. 4 includes views showing the results of observation of composites according to examples with an optical microscope.

FIG. 5 includes views showing the results of observation of a composite according to an example with a scanning electron microscope (SEM).

FIG. 6 includes graphs showing the results of particle size measurement of particles dispersed in a composite according to an example by a dynamic light scattering method.

FIG. 7 includes graphs showing the results of particle size measurement of particles dispersed in a composite according to an example by a dynamic light scattering method.

DESCRIPTION OF REFERENCE NUMERALS

Figure 1:
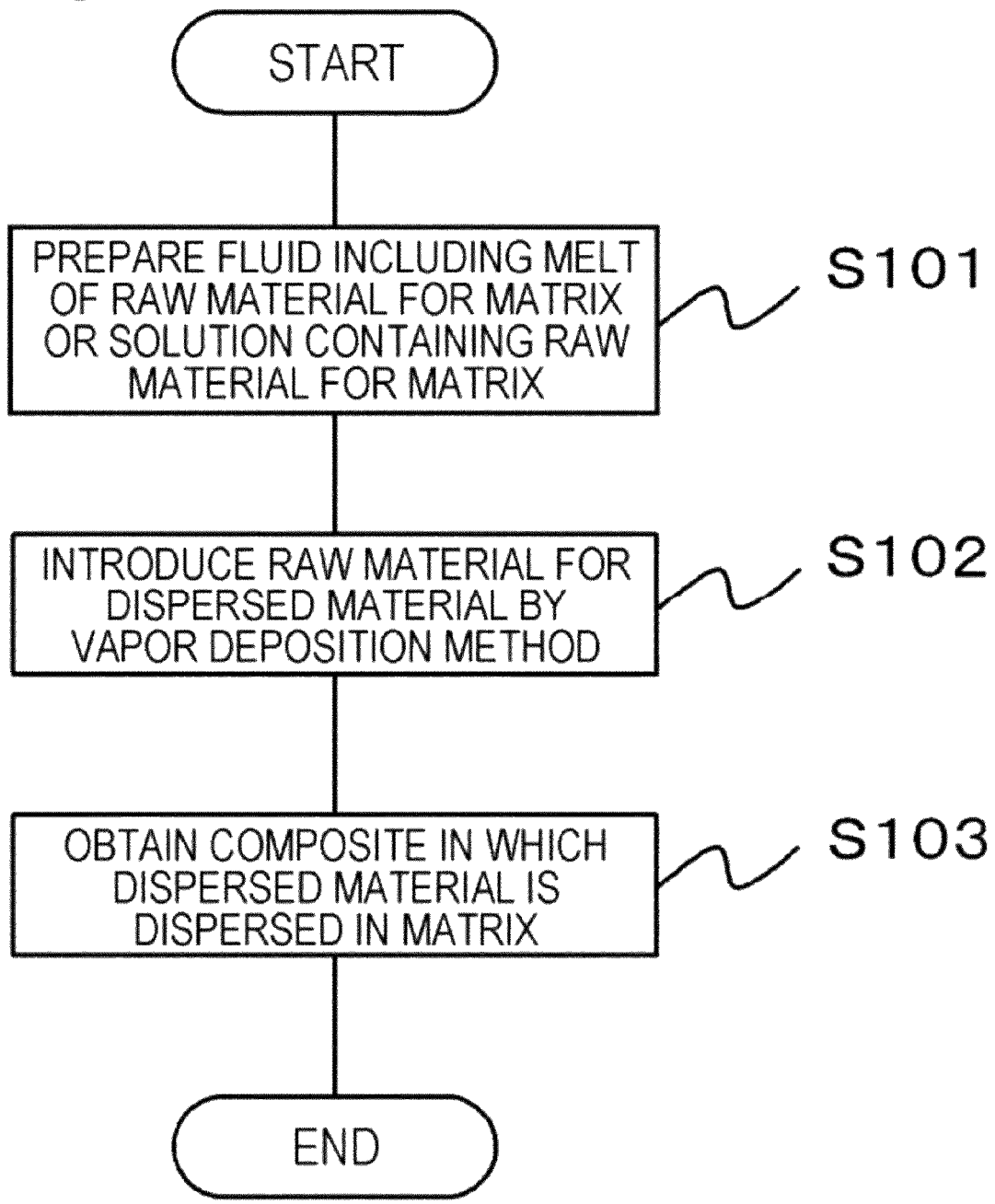
FIG. 1 is a flow chart for explaining a method for producing a composite according to an embodiment.

10 Hot plate
11 Ultrasonic stirrer
12 Fluid
13 Plasma device
14 Gas
15 Raw material for dispersed material

DESCRIPTION OF EMBODIMENTS

Hereinbelow, embodiments of the present invention will be described with reference to the accompanying drawings. It is to be noted that the same components in all the drawings have the same reference numerals and a description thereof will not be repeated.

A method for producing a composite according to the present invention includes introducing a raw material for dispersed material which constitutes a dispersed material into a fluid including a melt of a raw material for matrix which constitutes a matrix or a solution containing a raw material for matrix by a vapor deposition method to obtain a composite.

The use of such a production method makes it possible to obtain a composite having two or more phases, in which a micrometer- to nanometer-sized particulate, needle-like, or laminar dispersed phase made of one or two or more kinds of dispersed materials is distributed in a matrix.

The raw material for matrix is not particularly limited as long as it can be maintained in a melt state or a solution state under the conditions where vapor deposition of the raw material for dispersed material is performed. Specifically, the raw material for matrix include high-molecular materials, middle-molecular materials that are in a wax-like or rubber-like state at room temperature (25° C.), and low-molecular materials that are in an oil-like state at room temperature. More specifically, polymers, vaseline, and oils can be exemplified.

The fluid used in the present invention is not particularly limited as long as it can be fluidized by stirring, vibration, or the like. It is not limited to liquids, and includes semisolid materials such as gels and sols. The fluid may also be one that is fluidized only under certain conditions such as heating.

According to the present invention, the raw material for dispersed material introduced into the fluid is preferably fluidized in the fluid. By adjusting the direction in which the raw material for dispersed material is fluidized, it is possible to control the shape of a dispersed phase to be formed in the matrix. The shape of dispersed phase of a composite produced by the method according to the present invention is not particularly limited, but for example, a particulate, needle-like, spherical, rod-like, plate-like, laminar or polyhedral dispersed phase can be formed. Further, by adjusting the flow velocity of the fluid, it is possible to control the size or distribution of a dispersed phase to be formed in the matrix.

Examples of a method for dispersing the raw material for dispersed material in the fluid or a method for allowing the fluid to have fluidity so that the raw material for dispersed material can be dispersed in the fluid include a method in which the fluid is stirred, a method in which the fluid is laterally fluidized, and a method in which thermal convection is allowed to occur by changing the temperature of the fluid. Specific examples of the method in which the fluid is stirred include a method in which the fluid is ultrasonically stirred, a method in which the fluid is stirred using a stirrer or a magnetic stirrer, a method using an impeller, a method in which a container is vibrated, and a method in which a swirling flow is generated. A specific example of the method in which the fluid is laterally fluidized is a method in which a container containing the fluid is tilted, vibrated, swung, or vertically moved. For example, when the raw material for dispersed material is introduced into the fluid while the fluid is stirred, a particulate dispersed phase can be formed. On the other hand, when the raw material for dispersed material is introduced into the fluid while the fluid is laterally fluidized, a laminar dispersed phase can be formed.

The dispersion of the raw material for dispersed material may be started at the same time as the vapor deposition of the raw material for dispersed material onto the fluid or after the raw material for dispersed material is vapor-deposited onto the fluid. However, the raw material for dispersed material is preferably dispersed before it is converted into molecules in the fluid.

The vapor deposition method is not particularly limited as long as an element constituting the dispersed material can be generated in the form of fine particles such as atoms, molecules, or ions, and may be either a physical vapor deposition method or a chemical vapor deposition method. Specific examples of the physical vapor deposition method include vacuum vapor deposition, ion plating, and sputtering. Specific examples of the chemical vapor deposition (CVD) method include thermal CVD, laser CVD, plasma CVD, and optical CVD.

The vapor deposition method may be performed at atmospheric pressure ($1 \times 10^6$ Pa) or under vacuum. When the vapor deposition method is performed under vacuum, the degree of vacuum under which the vapor deposition method is performed maybe low to medium ($1 \times 10^{-1}$ Pa to $1 \times 10^6$ Pa), high to ultrahigh ($1 \times 10^{-9}$ Pa to $10^{-1}$ Pa), or extremely high ($<1 \times 10^{-9}$ Pa).

The above-described means makes it possible to obtain a composite in which a dispersed phase is formed in a matrix.

Figure 2:
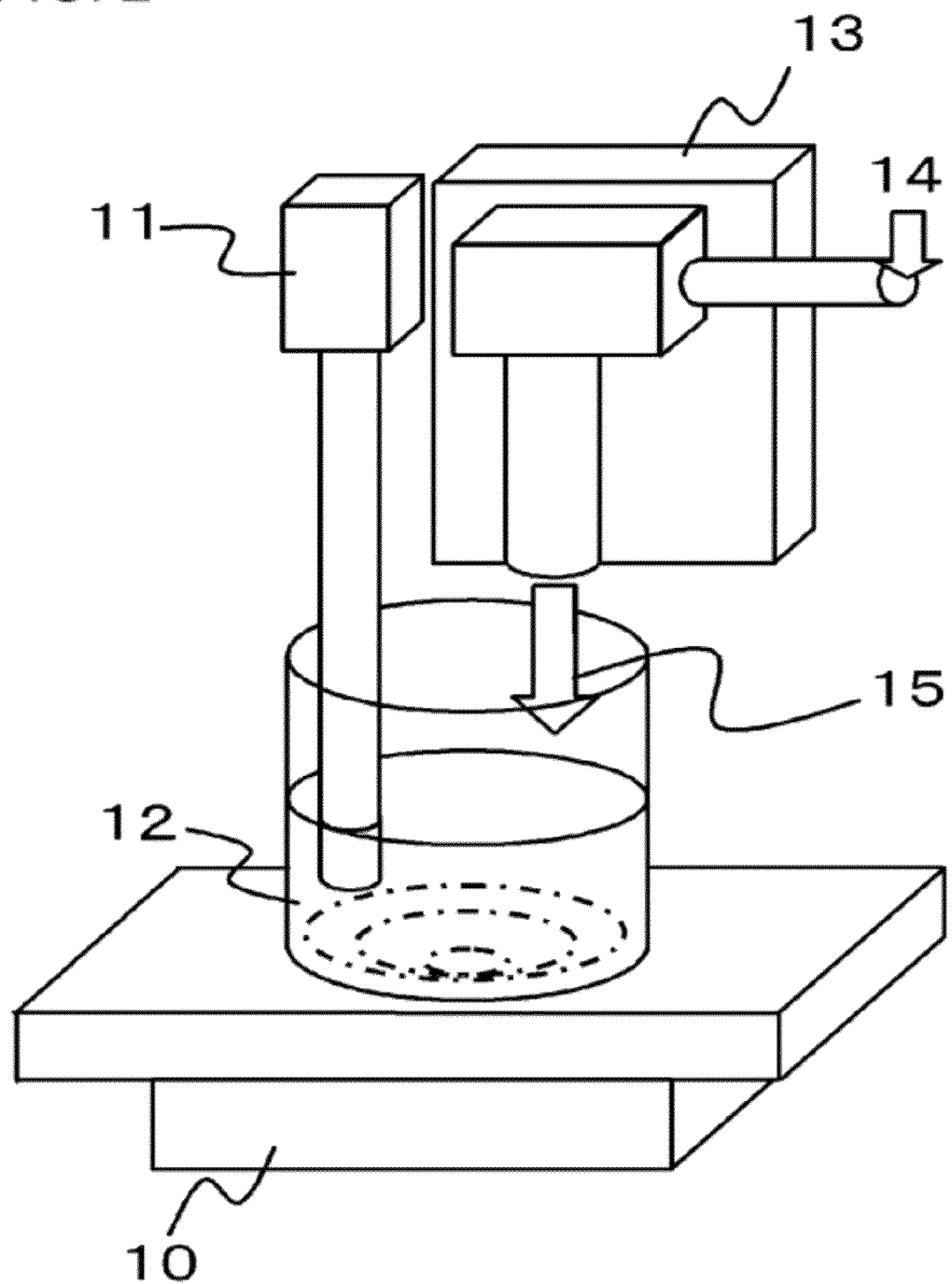
FIG. 2 is a schematic view showing the structure of an apparatus for producing a composite used in the embodiment.

Hereinbelow, one example of the method for producing a composite according to the present invention will be described in detail. FIG. 1 is a flow chart for explaining the method for producing a composite according to the present invention. FIG. 2 is a schematic view of one example of an apparatus for producing a composite used in the present invention. An apparatus for producing a composite according to the present invention includes: a fluidizing unit that fluidizes a fluid 12 including a melt of a raw material for matrix which constitutes a matrix or a solution containing a raw material for matrix; and a vapor deposition unit that introduces a raw material for dispersed material 15 which constitutes a dispersed material into the fluid 12 by a vapor deposition method. The apparatus shown in FIG. 2 includes, as the fluidizing unit, an ultrasonic stirrer (stirring unit) 11 that ultrasonically stirs the fluid 12; and a hot plate (heating unit) 10 that heats a raw material for matrix to obtain the fluid 12 and allows thermal convection to occur in the fluid 12. As the vapor deposition unit, a plasma device (plasma-generating unit) 13 can be provided that generates the raw material for dispersed material 15 in the form of plasma from a gas 14.

First, one or two or more polymers are prepared as a raw material for matrix. In the present invention, the term "polymer" refers to a polymerization substance which is polymerized two or more monomers. Therefore, the term "polymer" in the present invention includes oligomers (low-molecular polymers) having a molecular weight of $1 \times 10^3$ or less, prepolymers (middle-molecular polymers) having a molecular weight of $1 \times 10^3$ to $1 \times 10^5$, and high polymers having a molecular weight of $1 \times 10^5$. The polymer may be a homopolymer obtained by polymerizing one kind of monomer or a copolymer obtained by polymerizing two or more kinds of monomers. The polymer used in the present invention particularly preferably has a molecular weight of 100 or more.

The polymer used in the present invention may be an organic polymer or an inorganic polymer. "Organic polymer" is a general term for compounds having carbon atoms in a basic structural skeleton. Specifically, it can be exemplified biological polymers such as sugars, proteins, and nucleic acids; natural rubbers; synthetic rubbers; fibrous materials; and plastics. Although carbon allotropes such as graphite and diamond; metal carbonates such as carbon dioxide and calcium carbonate; hydrocyanic acid and metal prussiates; metal cyanates; and metal thiocynates are carbon-based molecular species, they are exceptionally classified as inorganic polymers. Specific examples of the inorganic polymer include glass whose skeleton contains silicon, and silicone resins, in addition to the above-mentioned exceptions to the organic polymer.

The organic polymer is preferably a plastic such as a thermoplastic resin or a thermosetting resin, more preferably polyethylene. As polyethylene, polyethylene of any density such as high-density polyethylene (HDPE), low-density polyethylene (LDPE), and linear low-density polyethylene (LLDPE) may be used. Examples of the thermoplastic resin include polyolefins such as polypropylene in addition to the above-mentioned polyethylenes; polyvinyl chloride; polystyrene; polyethylene terephthalate; polybutylene succinate (PBS) polymers; styrene-isoprene-styrene (SIS) polymers; and polystyrene-ethylene/butylene copolymers (SEBS) polymers. As the thermosetting resin, one that can be maintained in a melt state or a solution state before the start of curing is preferably used. Examples of such a thermosetting resin include phenol resins.

Then, the fluid 12 is prepared using the prepared polymer (S101 in FIG. 1). The fluid 12 may be prepared by heat-melting the polymer or by dissolving or dispersing the polymer in a liquid such as water or an organic solvent. A liquid polymer may be used as it is. When the fluid 12 is prepared by heat-melting the polymer, the hot plate 10 in the apparatus for producing a composite may be used, as shown in FIG. 2. The hot plate 10 also has the function of maintaining the temperature while heating the fluid 12 during the production of a composite. By heating the fluid 12 from the bottom of a container, thermal convection occurs in the fluid 12 so that a raw material for dispersed material introduced into the fluid 12 is dispersed in the fluid 12.

A viscosity modifier may be added to the fluid 12 as needed, so as to adjust the viscosity of the fluid 12. By adjusting the viscosity of the fluid 12, it is possible to change the dispersion state of a raw material for dispersed material. This makes it possible to control the size and distribution of a dispersed phase formed in a matrix. As the viscosity modifier, one that can be removed from a matrix by evaporation after the formation of a dispersed phase is preferably used.

Examples of the viscosity modifier to be added to the fluid 12 include decalin, chloroform, and toluene. The amount of the viscosity modifier to be added can be controlled depending on the viscosity of the polymer used and the size and distribution of a dispersed material to be formed. For example, when decalin is added as the viscosity modifier to polyethylene that is in a melt state, a composite having a micro-level dispersed phase can be obtained by adding 0 to 10 wt % of decalin to the fluid 12, a composite having a submicron-level dispersed phase can be obtained by adding 10 to 50 wt % of decalin to the fluid 12, and a composite having a dispersed phase with a submicron or less size can be obtained by adding 50 to 99 wt % of decalin to the fluid 12.

The fluid 12 prepared in this way can be stirred, for example, by the ultrasonic stirrer 11 as shown in FIG. 2. Then, a raw material for dispersed material is introduced by plasma CVD while the fluid 12 is stirred (S102 in FIG. 1).

The raw material for dispersed material is generated by converting the gas 14 into plasma with the use of the plasma device 13. As the gas 14, for example, when carbon is a dispersed material, a gas containing carbon as a constituent element can be used. Specifically, a hydrocarbon gas having 1 to 10 carbon atoms can be used. More specifically, examples of a hydrocarbon gas include methane gas, ethane gas, and acetylene gas. When glass is a dispersed material, a gas containing silicon as a constituent element can be used. Specifically, a polysilane gas having 1 to 10 silicon atoms or a trialkylsilane gas having 1 to 10 carbon atoms can be used. More specifically, examples of trialkylsilane gas include trimethylsilane gas. Even when a material used for generating the raw material for dispersed material in the form of plasma is solid or liquid at room temperature (25° C.), the gas 14 can be prepared by vaporizing it by applying heat or pressure, and then charged into the plasma device 13.

The gas 14 may be converted into plasma by adding any carrier gas. Examples of the carrier gas include nitrogen gas, oxygen gas, and ozone gas.

Plasma irradiation conditions depend on the type of polymer used or the state of the polymer. For example, the ratio of a dispersed phase in a composite can be adjusted to $10^{-3}$ wt % to 10 wt % by setting plasma irradiation time to 10 seconds to $1 \times 10^2$ seconds. Further, plasma irradiation may be performed continuously for a given length of time or intermittently at predetermined intervals.

Plasma irradiation may be performed under various pressure conditions. Such a pressure condition may be atmospheric pressure ($1 \times 10^6$ Pa), or vacuum. The form of a dispersed phase to be formed in a matrix can be changed by controlling the pressure at which plasma is generated. This makes it possible to control various physical properties of a composite. For example, amorphous carbon, diamond-like carbon (DLC), diamond, carbon nanotubes, or fullerene can be dispersed by generating plasma from the gas 14 containing carbon as a constituent element under various pressure conditions. DLC can be dispersed by generating plasma at about $1 \times 10$ Pa, for example.

Further, the raw material for dispersed material can be uniformly introduced inside fluid 12 and efficiently dispersed in the fluid 12 by irradiating plasma while stirring the fluid 12. The flow velocity of the matrix 12 is not particularly limited. For example, when the ultrasonic stirrer 11 of the example shown in FIG. 2 is used, the matrix 12 can be stirred under conditions where the frequency of the stirrer is 20 kHz and the output of the stirrer is 3 to 27 W.

Further, the particle size of a dispersed material to be dispersed in a matrix can be controlled by stirring of the fluid 12 controlled the viscosity. For example, a dispersed phase having a particle size of 10 μm or less can be obtained by irradiating plasma while stirring the fluid 12 adjusted to 0.01 to 100 Pa·s of viscosity. On the other hand, a dispersed phase having a particle size of 5 μm or less can be formed by adjusting the viscosity of the fluid 12 to 0.01 to 5 Pa·s. It is to be noted that the term "viscosity" in the present invention refers to one measured using a dynamic viscoelasticity measuring instrument (ARES-G2 rheometer manufactured by TA instruments) at a shear rate of 0.01 to 100 (1/s) under temperature conditions employed during plasma irradiation.

The above-described means makes it possible to obtain a polymer-based composite in which a dispersed phase is formed in the polymer (S103 in FIG. 1). The obtained composite may be used as it is, or may be further subjected to post-treatment. When the polymer in a melt state is used as the fluid 12, the resulting composite may be used as it is after plasma irradiation. On the other hand, when a polymer solution obtained by dissolving or dispersing the polymer in a liquid is used as the fluid 12, the resulting composite may be heated or cooled to remove the solvent. Further, when the viscosity modifier is also added to the fluid 12, the resulting composite may be warmed, heated, or cooled to remove the viscosity modifier. The removal of the solvent and the viscosity modifier may be performed at atmospheric pressure or under reduced pressure. Alternatively, the resulting composite may be cured by heating or cooling after plasma irradiation.

The composite produced in this way can be used for various applications such as packaging containers, electronic parts, vehicles, building materials, mechanical parts, medical equipment, and synthetic fibers for clothing. The composite can be molded by any method that varies depending on the intended use thereof, and molding can be performed by a well-known technique such as extrusion molding (film forming, sheet forming), blow molding, or injection molding.

Hereinbelow, the specific functions and effects of the present invention will be described in detail with reference to FIGS. 1 and 2. According to the present invention, a raw material for dispersed material 15 which constitutes a dispersed material can be introduced in the form of plasma into a liquid polymer into the fluid 12 including a melt of a polymer or a solution containing a polymer, thereby introducing the raw material for dispersed material 15 as plasma into a liquid form of polymer. Further, the plasma contains fine particles such as atoms, molecules, and ions, and these fine particles can be introduced into the liquid form of polymer as the raw material for dispersed material. This makes it possible to convert the fine particles such as atoms, molecules, ions, or plasma into molecules in the liquid form of polymer to disperse the molecules in the polymer as a dispersed material. Therefore, a polymer-based composite made of desired materials can be obtained by setting the state of the fluid 12 and the plasma conditions of the raw material for dispersed material.

Further, the raw material for dispersed material can be uniformly introduced into the polymer by irradiating plasma while stirring the polymer in a melt state, which makes it possible to obtain a polymer-based composite having the dispersed material uniformly dispersed in the polymer. For example, in the event that a particulate dispersed phase is formed, the average particle size of the dispersed phase can lie in the range of $1 \times 10^{-2}$ μm to $1 \times 10^{2}$ μm, the Cv value (defined as the ratio of standard deviation of average particle size to average particle size) of the dispersed phase can lie in the range of 1 to 100%, and the particle size distribution of the dispersed phase can be $0.5 \leq Dw/Dn \leq 2$, when Dw is defined as a weight-average particle size, and Dn is defined as a number-average particle size. It is to be noted that the term "particle size" as used herein refers to one measured using an optical microscope or a dynamic light scattering method, the term "weight-average particle size" as used herein refers to an average from the main peak of a weight-based distribution measured by DLS-8000 manufactured by Otsuka Electronics Co., Ltd. based on the principles of dynamic light scattering, and the term "number-average particle size" as used herein refers to an average from the main peak of a number-based distribution measured by DLS-8000 manufactured by Otsuka Electronics Co., Ltd. based on the principles of dynamic light scattering.

Further, the size of the dispersed material can be easily controlled by controlling the viscosity of the fluid 12.

As described above, according to the present invention, it is possible to easily obtain a desired composite.

The embodiments of the present invention have been described above with reference to the accompanying drawings, but are illustrative examples of the present invention and can employ various configurations other than those described above.

EXAMPLES

Example 1

A composite in which amorphous carbon particles were dispersed in polyethylene was produced using the apparatus shown in FIG. 2. 7 g of polyethylene (manufactured by Aldrich, product number: 427799, molecular weight: 35000) was placed in a beaker, and the beaker was placed on the hot plate 10, and then melt the polyethylene by heating to 150° C., to prepare the fluid 12 made of polyethylene. The viscosity of the fluid 12 measured at this time using a dynamic viscoelasticity measuring instrument (ARES-G2 rheometer manufactured by TA Instruments) at a shear rate of 0.01 to 100 (1/s) at 150° C. was 22 Pa·s. Then, the fluid 12 stirred by the ultrasonic stirrer 11 (astrason 3000 manufactured by MISONIX, 20 W) was irradiated with plasma for 20 seconds from 1 cm above while heated at 150° C. The plasma was generated at atmospheric pressure by charging, nitrogen gas containing 1 mass% of acetylene as the gas 14 into the plasma device 13 (manufactured by Plasmatreat under the trade name of Generator, Type: FG3001). The voltage and current of the plasma device 13 were 280 V and 2.2 A, respectively. As a result of plasma irradiation, the fluid 12 turned brown. In this way, a composite was obtained.

Example 2

In the manner as Example 1, 22 wt % of decalin was added in the fluid 12. The viscosity of the fluid 12 as measured in this time was 9.0 Pa·s. Plasma irradiation was carried out, and then fluid 12 was maintained at 200° C. to volatilize the decalin. The same manner as Example 1 was performed except the above.

Example 3

In the manner as Example 2, 36 wt % of decalin was added in the fluid 12. The viscosity of the fluid 12 as measured in this time was 3.6 Pa·s. The same manner as Example 2 was performed except the above.

Example 4

In the manner as Example 2, 53 wt % of decalin was added in the fluid 12. The viscosity of the fluid 12 as measured in this time was 2.8 Pa·s. The same manner as Example 2 was performed except the above.

Example 5

In the manner as Example 2, 63 wt % of decalin was added in the fluid 12. The viscosity of the fluid 12 as measured in this time was 0.67 Pa·s. The same manner as Example 2 was performed except the above.

Example 6

In the manner as Example 2, 80 wt % of decalin was added in the fluid 12. The viscosity of the fluid 12 as measured after adding decal in was 0.24 Pa·s. The same manner as Example 2 was performed except the above.

Example 7

In the manner as Example 2, 85 wt % of decalin was added in the fluid 12. The viscosity of the fluid 12 as measured in that time was 0.17 Pa·s. The same manner as Example 2 was performed except the above.

Comparative Example 1

The fluid 12 made of polyethylene which was prepared in Example 1 was not irradiated with plasma.

Comparative Example 2

In the manner as Example 1, 85 wt % of decalin was added in the fluid 12. The fluid 12 was not irradiated with plasma. Then, the fluid 12 was maintained at 200° C. to volatilize the decalin.
Production of Film
3 g of each of the composites obtained in Examples 1 to 7 and the polyethylenes prepared in Comparative Examples 1 and 2 were prepared, and were then applied onto and sandwiched between two stainless steel plates (100×100×2 mm). Then, the two stainless steel plates were placed in a compact heat press machine (manufactured by AS ONE Corporation, 451084) set at 100° C. As a result, it was confirmed that the composite or the polyethylene was melted. Then, pressure applied to the heat press machine was adjusted so that a film having a thickness of about 0.1 mm was obtained and was maintained for 10 minutes. Then, the stainless steel plates were taken out of the heat press machine and allowed to stand for 15 minutes to cool them to room temperature (25° C.). In this way, a film was produced.

Evaluations
1. Elementary Analysis of Dispersed Phase

Plasma irradiation was performed in the same manner as in Example 1 except that the fluid 12 was changed to a silicon substrate. Thus, a silicon substrate was irradiated with plasma which was generated from nitrogen gas containing 1 mass % of acetylene at atmospheric pressure, for 20 seconds from 1 cm above, to form a carbon film by vapor deposition. Elementary analysis was performed using the plasma-treated silicon substrate and an X-ray photoelectron spectrometer (JPS-9000MC manufactured by JEOL). More specifically, the carbon film was subjected to argon etching to perform elementary analysis in its depth direction. Etching times were 0, 10, 20, and 30 seconds.

Figure 3:
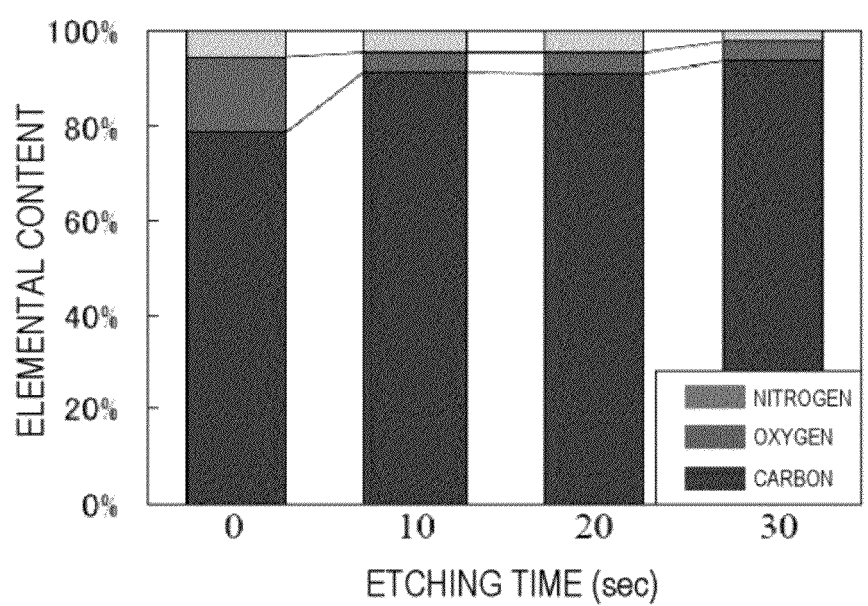
FIG. 3 is a graph showing the results of elementary analysis of a dispersed phase of a composite according to an example.

The results are shown in FIG. 3. In FIG. 3, the vertical axis represents the elemental contents of carbon, oxygen, and nitrogen, and the horizontal axis represents the number of seconds during which argon etching was performed. As a result of the elementary analysis of the carbon film subjected to argon etching for 0 sec, the elemental contents of the surface of the carbon film were found to be about 80% of carbon, about 15% of oxygen, and about 5% of nitrogen, respectively. On the other hand, as a result of the elementary analysis of the carbon film subjected to argon etching for 10, 20, and 30 seconds, the elemental contents of the inside of the carbon film were found to be about 90% of carbon, about 5% of oxygen, and about 5% of nitrogen, respectively. Thus, they were substantially the same regardless of the seconds for etching. From the results, it has been found that the films of Examples 1 to 7 have a dispersed phase containing carbon.

Further, the carbon content and the oxygen content of the inside of the film were substantially the same regardless of the depth of etching. From this, it has been found that a carbon atom is bonded not to an oxygen atom but to a carbon atom with each other in the process of forming a film from plasma on the silicon substrate, so that an amorphous carbon film is formed. Therefore, it has been found that the dispersed phase of each of the films of Examples 1 to 7 contains amorphous carbon. As described above, the oxygen content of the surface of the carbon film was about 15%, whereas the oxygen content of the inside of the carbon film was about 5%. It is considered that the reason for this is that oxygen in the atmosphere was reacted with the end of acetylene plasma on the surface of the silicon substrate.

2. Observation with Optical Microscope

The films of Examples 1 and 7 and Comparative Example were observed with an optical microscope (ECLIPSEL150 manufactured by NICON). The results are shown in FIG. 4. FIG. 4(a) shows the results of Example 1, FIG. 4(b) shows the results of Example 7, and FIG. 4(c) shows the results of Comparative Example 1. A plurality of particles were uniformly dispersed without agglomeration in each of the films of Examples 1 and 7, whereas nothing was observed in the film of Comparative Example 1. Further, the particles dispersed in the film of Example 7 were larger in number and smaller in particle size than those dispersed in the film of Example 1. The particles observed in the film of Example had a particle size of about 1 μm.

3. Observation with Scanning Electron Microscope (SEM)

The film of Example 7 was observed with a field emission scanning electron microscope (FE-SEM) (Carl Zeiss Ultra 55 manufactured by Carl Zeiss). The results are shown in FIGS. 5(a) and 5(b). Particles having a particle size of about 1 μm were hardly observed with SEM. It is considered that the reason for this is that the optical microscope observes particles located inside the film because light passes through the film, whereas the scanning electron microscope observes the surface of the film.

From the above results of Evaluations 1 to 3, it can be said that each of the films of Examples 1 to 7 has amorphous carbon particles dispersed in the inside thereof.

Figure 8:
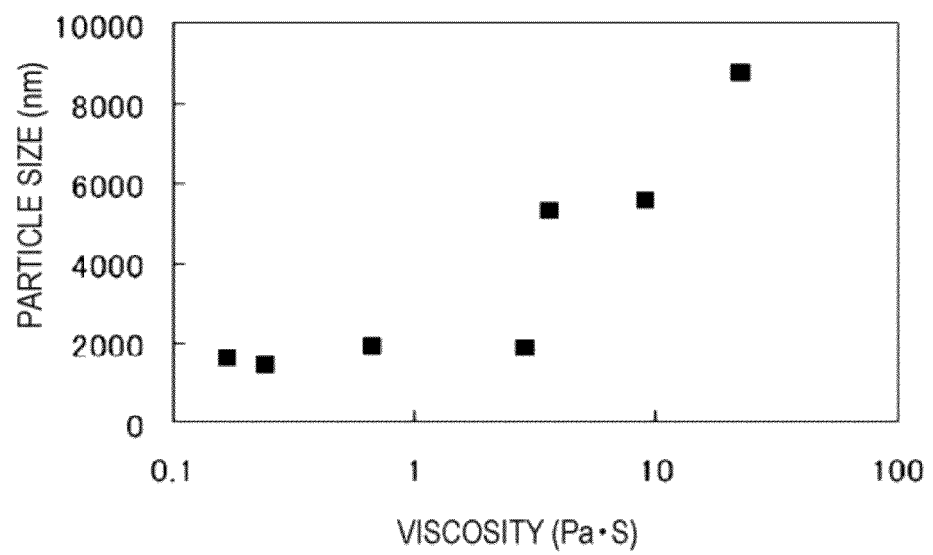
FIG. 8 is a graph showing the results of particle size measurement of particles dispersed in composites according to examples by a dynamic light scattering method.

4. Particle Size Measurement of Amorphous Carbon Particles by Dynamic Light Scattering The particle size of particles dispersed in the inside of each of the films of Examples 1 to 7 and Comparative Example 2 was measured and analyzed by a dynamic light scattering photometer (DLS-8000 manufactured by Otsuka Electronics Co., Ltd.). The results are shown in FIGS. 6 to 8 and Table 1. FIG. 6 shows the results of particle size measurement. In FIG. 6, the vertical axis represents relative scattering intensity determined when the total scattering intensity is defined as 100, and the horizontal axis represents particle size. FIG. 6(a) shows the results of Example 7, and FIG. 6(b) shows the results of Comparative Example 2. As shown in FIG. 6(a), one peak was observed in the range of about 600 nm to 1500 nm and the other peak was observed at about 20 μm. On the other hand, as shown in FIG. 6(b), in the case of the film of Comparative Example 2, only one peak was observed at about 20 μm. From the results, it is considered that the peak observed in the range of about 600 nm to 1500 nm results from the amorphous carbon particles constituting the dispersed phase. The scale of the measurement results was substantially the same as that of the results of observation with the optical microscope. Further, crystallized polyethylene particles were observed with the optical microscope, and as a result, the particle size thereof was found to be about 20 μm. From this, it has been found that the peak observed at about 20 μm in FIG. 6 results from crystallized polyethylene particles.

TABLE 1

|  | Average particle size of amorphous carbon particles (μm) |
| --- | --- |
| Example 1 | 8.8 |
| Example 2 | 5.6 |
| Example 3 | 5.4 |
| Example 4 | 1.9 |
| Example 5 | 2.0 |
| Example 6 | 1.5 |
| Example 7 | 1.7 |

FIG. 7(a) is a graph showing the correlation between the weight-based distribution and the particle size of particles dispersed inside the film of Example 7. FIG. 7(b) is a graph showing the correlation between the number-based distribution and the particle size of particles dispersed inside the film of Example 7. In FIG. 7, the vertical axis represents a relative value determined when the total weight or the total number is defined as 100. In the graph of weight-based distribution shown in FIG. 7(a), a peak observed at about 1 μm is very small but a peak observed at about 20 μm is very large. On the other hand, in the graph of number-based distribution shown in FIG. 7(b), a peak observed at about 1 μm is very large, but a peak observed at about 20 μm is very small. From this, it has been found that amorphous carbon particles are present inside the film and are much lighter in weight than polyethylene crystals. The Cv value (ratio of standard deviation of average particle size to average particle size) of Example 1 was 40% and the Cv value of Example 7 was 8.7%. When a weight average particle size is defined as Dw and a number average particle size is defined as Dn, Dw was 7.14 μm and Dw/Dn was 1.2 in Example 1, respectively, and Dw was 1.57 μm and Dw/Dn was 1.1 in Example 7, respectively.

FIG. 8 is a graph showing the relation between the viscosity of polyethylene in a fluidized state and the particle size of the resulting amorphous carbon particles. Specifically, a peak appeared in about 10 μm or less was analyzed as the particle size of the amorphous carbon particles regarding the films obtained in Examples 1 to 7, and the measured particle size was plotted against the viscosity of the polymer in a melt state measured in the process of producing a composite of each of Examples 1 to 7 to determine the relationship between them. As a result, it has been found that the particle sizes of the amorphous carbon particles are distributed between about 1000 nm to about 9000 nm, and the particle size of the amorphous carbon particles depends on the viscosity of the fluid 12.

5. Evaluation of Physical Properties (1) Oxygen Permeability

Figure 9:
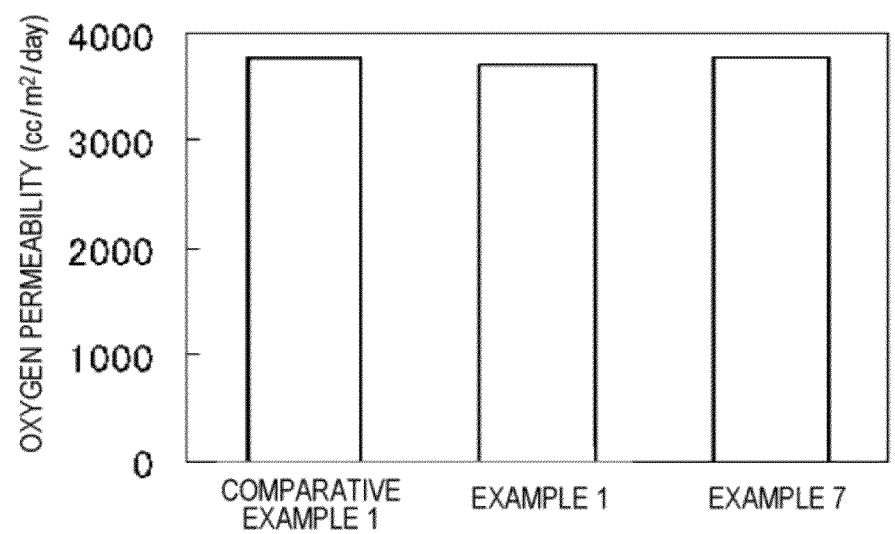
FIG. 9 is a graph showing the results of oxygen permeability measurement of composites according to examples.

The oxygen permeability of each of the films of Examples 1 and 7 and Comparative Example 1 was measured by an oxygen permeability measuring instrument (OX-TRAN 2/21 manufactured by MOCON, Inc) in accordance with JIS K-7126-2. An experiment was performed by measuring the amount of oxygen passing through 1 cm$^2$ of each of the films per day at a temperature of 23° C. and a humidity of 93%. The results are shown in FIG. 9. As shown in FIG. 9, there was no difference in oxygen permeability among these films.

(2) Tensile Test

Figure 10:
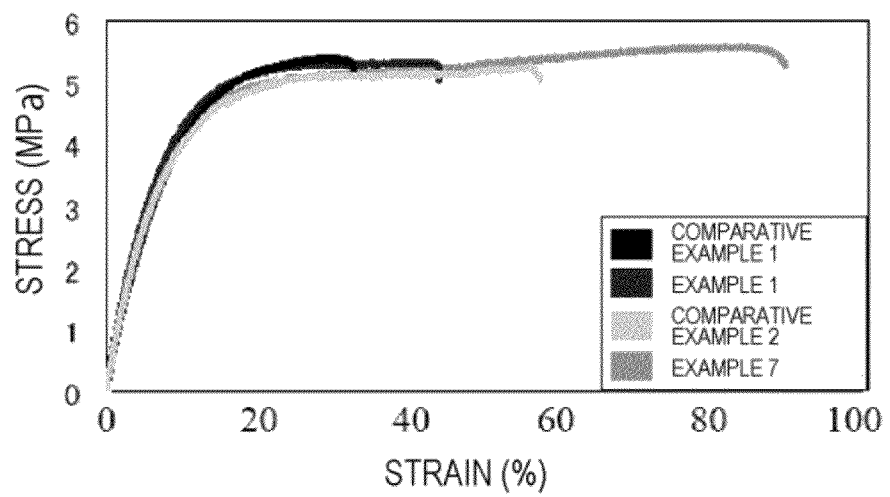
FIG. 10 is a graph showing the results of a tensile test performed on composites according to examples.
Figure 11:
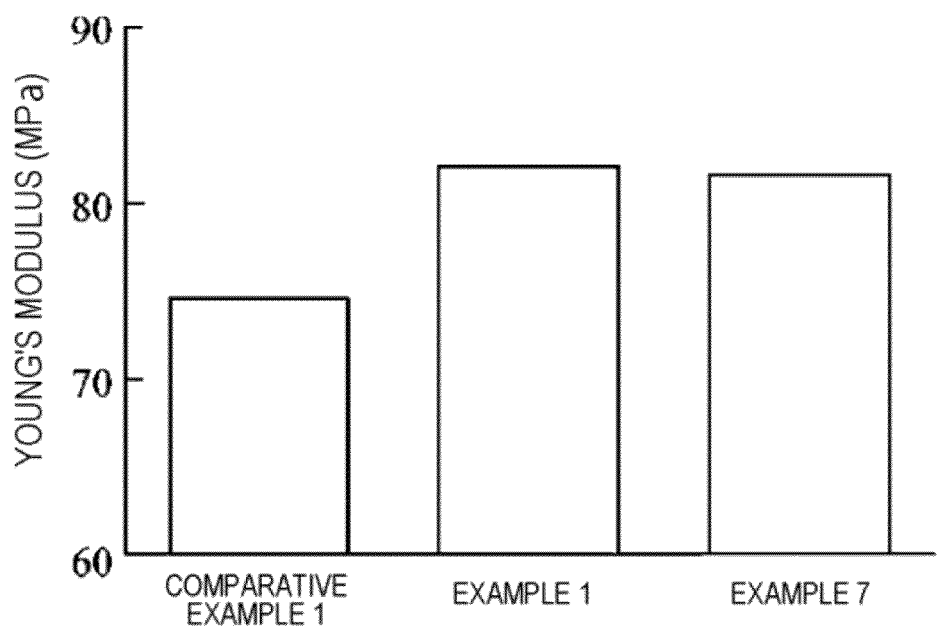
FIG. 11 is a graph showing the Young's modulus of composites according to examples.
Figure 12:
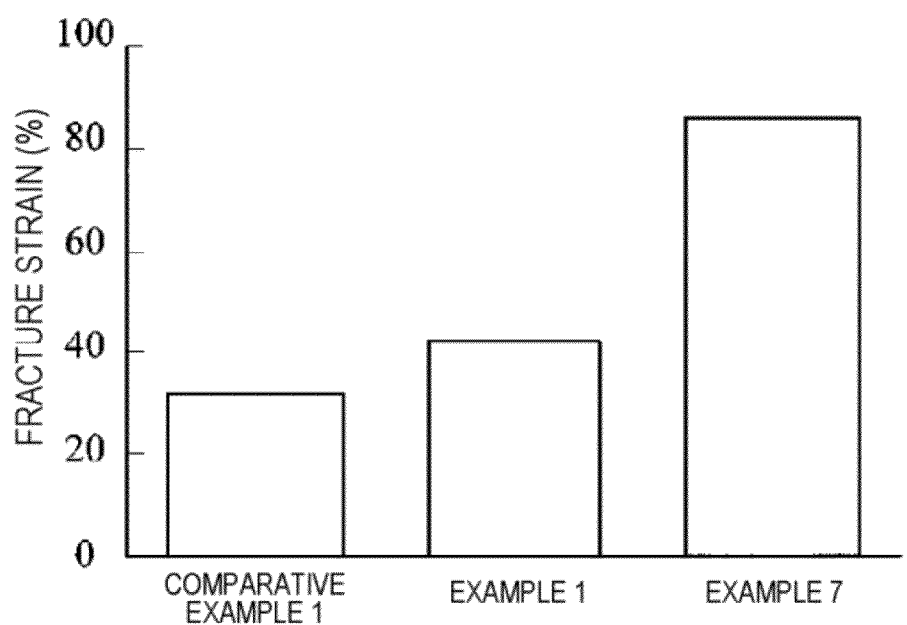
FIG. 12 is a graph showing the fracture strain of composites according to examples.

A tensile test was performed on the films of Examples 1 and 7 and Comparative Example 1 with the use of a tensile tester (AG-50NIS MS manufactured by Shimadzu Corporation). The tensile test is carried out in accordance with JIS K-7113 at room temperature (25° C.) and a test speed of 10 mm/min. Measurement samples were prepared by cutting out 16.5×3 mm pieces specified by JIS standards from each of the films with the use of a dumbbell cutter. The test was performed 5 times per each of the films using the measurement samples, and measured values were averaged. The elastic modulus of each of the films was calculated from the strain between $2.5\times10^{-4}$ and $5\times10^{-4}$. The strain at the time when the maximum stress was applied to the sample was defined as fracture strain. FIG. 10 is a graph showing the results of the tensile test. FIG. 11 is a graph showing the elastic modulus of each of the films calculated from the results shown in FIG. 10. FIG. 12 is a graph showing the fracture strain of each of the films calculated from the results shown in FIG. 10. The results shown in FIGS. 11 and 12 indicate that the elastic modulus and the fracture strain are increased by dispersing amorphous carbon particles in polyethylene by the method according to the present invention.

Example 8

Figure 13:
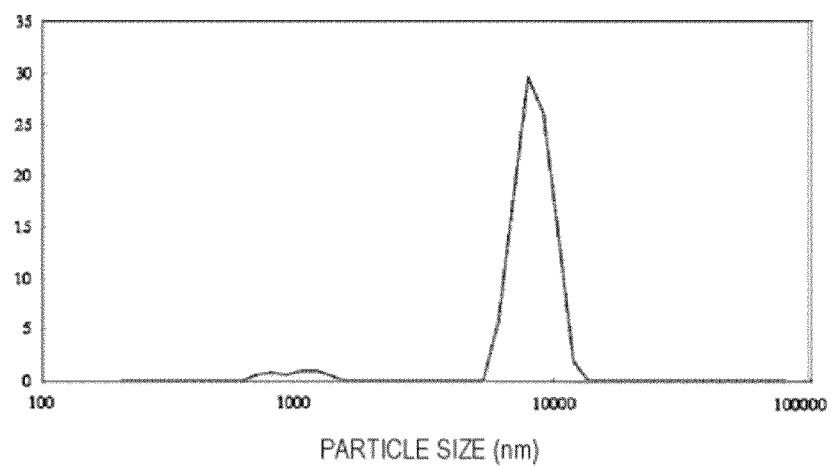
FIG. 13 is a graph showing the results of particle size measurement of particles dispersed in a composite according to an example by a dynamic light scattering method.

A composite in which silica (SiOx) was dispersed in polyethylene was prepared. The fluid 12 was prepared by adding 85 wt % of decalin to polyethylene and irradiated with plasma in the same manner as in Example 7. In this example, nitrogen gas containing 1 mass % of trimethylsilane was charged as the gas 14 to incorporate into the plasma device 13 in place of nitrogen gas containing 1 mass% of acetylene, and then generate plasma. Then, a film was produced in the same manner as in the above-described case where a film was produced from each of the composites of Examples 1 to 7. The particle size of particles dispersed inside the film was measured and analyzed by a dynamic light scattering photometer. The results are shown in FIG. 13. In FIG. 13, the vertical axis represents relative scattering intensity determined when the total scattering intensity is defined as 100 and the horizontal axis represents particle size. As shown in FIG. 13, the peak of SiOx constituting a dispersed phase is observed at around about 1000 nm and the peak of polyethylene is observed at around about 10000 nm.

Example 9

In the manner as Example 1, the fluid 12 was prepared by using 7 g of polypropylene (manufactured by Aldrich, product number: 452149, molecular weight: 174000) in place of polyethylene. Further, 85 wt % of decalin was added to the fluid 12. Plasma irradiation was carried out, and then the decalin was volatilized. The same manner as Example 1 was performed except the above. The fluid 12 turned brown by plasma irradiation. Therefore, it was confirmed that a composite was produced.

Example 10

The fluid 12 was prepared by using 7 g of polypropylene (manufactured by Aldrich, product number: 452149, molecular weight: 174000) in place of polyethylene.

In the manner as Example 1, the fluid 12 was prepared 7 g of polystyrene (manufactured by Aldrich, product number: 430102, molecular weight: 230000) in place of polyethylene. Further, 85 wt % of chloroform was added to the fluid 12. Plasma irradiation was carried out, and then the chloroform was volatilized. The same manner as Example 1 was performed except the above. The fluid 12 turned brown by plasma irradiation. Therefore, it was confirmed that a composite was produced.

This application claims priority from Japanese Patent Application No. 2009-200019 filed on Aug. 31, 2009, the entire disclosure of which is incorporated herein by reference.

The invention claimed:

1. A method for producing a composite comprising a matrix and a dispersed material dispersed in the matrix, the method comprising introducing a raw material to be dispersed into a fluid comprising a melted raw material of matrix or a solution containing the raw material of matrix by a vapor deposition method, to obtain the composite,
   wherein the vapor deposition method is a chemical vapor deposition method, and
   the raw material to be dispersed is introduced into the fluid by irradiating a surface of the fluid with plasma containing the raw material to be dispersed.

2. The method for producing a composite according to claim 1, further comprising dispersing the raw material to be dispersed in the fluid after the raw material to be dispersed is introduced into the fluid.

3. The method for producing a composite according to claim 2, wherein the raw material to be dispersed is dispersed in the fluid by stirring.

4. The method for producing a composite according to claim 1, comprising preparing the fluid in a container,
   wherein the raw material to be dispersed is dispersed in the fluid while allowing thermal convection to occur in the fluid placed in a container by heating the fluid from a bottom of the container.

5. The method for producing a composite according to claim 1, wherein the raw material to be dispersed is generated by using a hydrocarbon gas having 1 to 10 carbon atoms or a polysilane gas having 1 to 10 silicon atoms.

6. The method for producing a composite according to claim 1, wherein the fluid comprises a melted polymer, or a polymer solution in which a polymer is dissolved or dispersed in a liquid.

7. The method for producing a composite according to claim 1, wherein the matrix is a thermoplastic resin selected from the group consisting of polyolefins, polyvinyl chloride, polystyrene, polyethylene terephthalate, polybutylene succinate (PBS) polymers, styrene-isobutylene-styrene (SIS) polymers, and polystyrene-ethylene/butylene copolymers (SEBS) polymers and the dispersed material is carbon or glass.

8. The method for producing a composite according to claim 1, wherein the fluid contains a viscosity modifier that adjusts a viscosity of the fluid.

9. A composite produced by the production method according to claim 1.

10. The method for producing a composite according to claim 1, wherein the raw material to be dispersed is generated using a hydrocarbon gas having 1 to 10 carbon atoms.

11. The method for producing a composite according to claim 1, wherein the matrix is a polymer and the dispersed material is amorphous carbon.

12. A method for producing a composite comprising a matrix and a dispersed material dispersed in the matrix, the method comprising:
   providing a matrix material in a fluid state;
   stirring the matrix material in the fluid state; and
   introducing a raw material to be dispersed into the matrix material in the fluid state by a vapor deposition method during said stirring, to obtain the composite,
   wherein the matrix material in the fluid state is a melted matrix material or a matrix material solution, and
   the raw material to be dispersed is introduced into the fluid by irradiating a surface of the fluid with plasma containing the raw material to be dispersed.

13. A method for producing a composite comprising a matrix and a dispersed material dispersed in the matrix, the method comprising:
   providing a matrix material in a fluid state; and
   irradiating a surface of the fluid with a vapor of a material to be dispersed from above.

14. The method according to claim 13, wherein the method comprises vertically irradiating the surface of the fluid with the vapor from above.

15. The method according to claim 13, wherein the vapor of the material is introduced into the matrix only by the irradiating the surface of the fluid with the vapor of the material from above.

16. The method according to claim 13, wherein the vapor is in a form of plasma.

17. The method according to claim 13, wherein the method comprises plasma irradiating the surface of the fluid with the vapor in a form of plasma from above.

18. The method according to claim 13, wherein the vapor of the material is introduced into the matrix only through the surface of the fluid by irradiating the surface of the fluid with the vapor of the material from above.

* * * * *